United States Patent [19]

Mason et al.

[11] Patent Number: 4,681,266

[45] Date of Patent: Jul. 21, 1987

[54] METHOD OF PARTICULATING AGGLOMERATED CATALYST MATERIALS

[75] Inventors: Ronald G. Mason; Emory W. Pitzer; Max P. McDaniel, all of Bartlesville, Okla.; David L. Rogers, Houston, Tex.; James W. Waterman, Bartlesville, Okla.

[73] Assignee: Phillips Petroleum Company, Bartlesville, Okla.

[21] Appl. No.: 820,344

[22] Filed: Jan. 21, 1986

[51] Int. Cl.$^4$ ............... B02C 19/12; B02C 23/24
[52] U.S. Cl. ............................ 241/18; 241/24; 241/57; 241/74
[58] Field of Search ............ 241/30, 18, 19, 24, 241/74, 79.1, 65, 86.1, 57, 23, 189 R, 101 B, 101 D

[56] References Cited

U.S. PATENT DOCUMENTS

| | | | |
|---|---|---|---|
| 2,517,990 | 8/1950 | Dressel | 241/86.1 X |
| 2,886,254 | 5/1959 | Rohlinger et al. | 241/86.1 X |
| 3,104,069 | 9/1963 | Ferguson | 241/83 |
| 3,169,711 | 2/1965 | Helms | 241/74 |
| 3,266,677 | 8/1966 | Hamilton . | |
| 3,408,963 | 11/1968 | Alexander . | |
| 3,545,007 | 12/1970 | Hamilton . | |
| 4,101,080 | 7/1978 | Schmidt | 241/51 |
| 4,444,964 | 4/1984 | McDaniel | 526/105 |

Primary Examiner—Mark Rosenbaum
Attorney, Agent, or Firm—French and Doescher

[57] ABSTRACT

A method for producing particles having a controlled particle size from agglomerated material is provided. Agglomerated material is passed through a beater mill and subjected simultaneously to the beating action of a plurality of blades and a vigorous stream of air as the agglomerated material impacts the peripheral screen of the beater mill. Catalyst or catalyst support particles having a readily controlled particle size and pore volume as well as narrow particle size distribution, are obtained as a result of the invention particulation method 23 Claims, 2 Drawing Figures

METHOD OF PARTICULATING AGGLOMERATED CATALYST MATERIALS

This invention relates to the production of catalyst particles and catalyst support particles of controlled particle size from agglomerated catalyst materials.

BACKGROUND OF THE INVENTION

Refractory materials are conventionally used as catalysts and catalyst supports. Such materials, however, suffer the disadvantage of producing fines when the catalyst is subjected to normal handling operations. The fines present several problems in that they complicate the catalyst activation procedures, feed erratically to the reactor, and result in the production of polymer fines when the catalyst is used for polymerization. This problem is particularly acute in supports used for olefin polymerization catalysts which generally cannot be subjected to treatments involving the use of water to reduce fines.

One solution to the problem of catalyst fines is to agglomerate catalyst or catalyst support particles, and then grind and separate the agglomerated material into particles having the desired particle size. A problem with this procedure is the loss of substantial quantities of the agglomerated material as fines during the grinding and separation process. What is needed, therefore, is a particulation process which gives catalytic material with controlled particle size without producing excessive amounts of fine catalyst or catalyst support particles as a result of the particulation process.

OBJECTS OF THE INVENTION

An object of the invention, therefore, is a method for particulation of agglomerated catalyst material.

Another object of the present invention is the production of particulate catalyst material with controlled particle size from agglomerated catalyst material.

Yet another object of the present invention is the production of particulate catalyst material with a narrow particle size distribution.

A further object of the present invention is the production of particulate catalyst material with controlled pore size distribution.

These and other objects and advantages of the invention will become apparent from inspection of the detailed description of the invention and the appended claims.

STATEMENT OF THE INVENTION

We have discovered that catalyst particles having controlled particle size can be produced from agglomerated catalyst material, i.e., gels, doughs, and the like, by passing the agglomerated catalyst material through a beater mill which subjects the agglomerated catalyst material to high speed beating action and a high rate of air flow so that the broken up agglomerated catalyst material impinges on the screen of the beater mill with high velocity.

The agglomerated catalyst material is thus simultaneously subjected to the beating and breaking action of the blades of the beater mill, extrusion through the screen of the beater mill by high speed impact therewith, and surface drying of the extruded particles to prevent re-agglomeration once the particles have passed through the screen of the beater mill.

DETAILED DESCRIPTION OF THE INVENTION

In accordance with the present invention, agglomerated catalyst material is passed through a beater mill comprising a cylindrical housing, a cylindrical screen therein, a central shaft and at least one rotor having a plurality of blades thereon rotatably mounted on the shaft; the rotor is rotated at a rate sufficient so that when the blades on the rotor impact the agglomerated catalyst material, it is caused by the impact to break up into particles; the force of the impact by the rotating blades on the agglomerated catalyst material also causes the particles to pass through a screen of specified mesh size. Concurrent with the beating action to which the agglomerated catalyst material is subjected, the agglomerated catalyst material is subjected to a vigorous flow of optionally heated air of sufficient flow rate to remove sufficient volatile material from the agglomerated catalyst material to render the agglomerated catalyst material non-sticky as it passes through the cylindrical screen of the beater mill.

The term "beater mill" as used in this disclosure is intended to include a variety of equipment available to the skilled artisan for grinding and drying of particulate material, including hammer mills, grinding mills, hopper mills, etc.

The agglomerated catalyst material contemplated to be particulable in accordance with the present invention can be any catalyst or catalyst support, gel, dough, or the like, i.e., fluid solid-liquid mixtures containing in the range of about 40 up to 95% of a highly volatile organic liquid. Such materials can be prepared in many different ways, as known by those skilled in the art. Materials contemplated to be within the scope of the term "agglomerated catalyst material" include silica, silica-titania, alumina, aluminum phosphate (especially aluminum phosphate having a phosphorus:aluminum ratio in the range of about 0.2:1 up to 0.6:1), magnesia, and the like, as well as mixtures of any two or more thereof.

A preferred method for forming the agglomerated catalyst material to be processed in accordance with the present invention comprises: (1) combining an acid composition in a liquid polar organic compound with the particulate refractory material to give a workable mixture; and (2) working the mixture, for instance by stirring, during which time a decrease in volume occurs. In a particularly preferred embodiment, the agglomerated material can be further treated, prior to the inventive particulation process, by (3) shaping the material into beads, pellets, extrudate, bricks or other shapes; and, if desired, (4) partially drying the shaped mixture. Finally, the agglomerated catalyst material can be prepared in finished form by subjecting the agglomerated catalyst material to the inventive particulation process, and then, optionally, calcining.

The liquid polar organic compound employed in step (1) above can be an ester, ketone, aldehyde, alcohol or other normally liquid polar organic compound, or mixtures of any two or more thereof. Alcohols are preferred, particularly 1–6 carbon atom alkanols, most preferably methanol because of its hydrophilic nature.

The acid can be either a mineral acid such as nitric acid, hydrochloric acid, or sulfuric acid or it can be an organic acid, such as, for example, acetic acid, oxalic acid, or propionic acid. Alternatively, instead of an acid as such, a compound imparting acidic characteristics to the composition can be used to produce the acid composition. For instance, chromium nitrate can be used to provide both the chromium for the finished catalyst and the acidic conditions needed for catalyst preparation. Generally, the acidic salt will give a pH of 2 to 4 when dissolved in water to form a 0.1M solution. Examples of acidity imparting compounds are chromium (III) nitrate, chromium (VI) oxide, aluminum nitrate, $NH_4H_2PO_4$, aluminum sulfate and chromium sulfate.

A particularly preferred acidic material is a fluoride which not only aids in agglomeration but also gives a surface fluoride treatment to catalyst supports such as, for example, aluminum phosphate. Such surface treatment is desirable in some instances to cause chain branching in the resulting polymer product when the treated support is used for the preparation of polymerization catalyst. Exemplary fluoride compounds are ammonium silicofluoride $(NH_4)_2SiF_6$ and ammonium bifluoride, $NH_4HF_2$. If desired the refractory material can be given a fluoriding treatment and/or a silicating treatment, for instance, by working the refractory material in the presence of an organic silicate in combination with the other techniques disclosed herein.

If the purpose is to produce a catalyst base, the amount of acid used is preferably sufficient to give about 0.02 to about 0.5 normality/liter in a polar organic compound. Otherwise any amount of acid short of an amount which will dissolve the entire refractory material can be used.

The working to reduce the volume can be done with any mixing device capable of mixing the composition. The polar organic liquid is preferbly used in an amount sufficient to give initial incipient wetness, i.e., about one volume of liquid per total volume of voids plus pore volume of the refractory material. Broadly, liquid in an amount from about 0.1 up to 2 times the total volume represented by the voids plus the pore volume can be used. Stated another way, the polar organic liquid is preferably used in an amount within the range of about 0.3 up to 5, preferably 1–3 milliliters per gram (mL/g) of solid particulate refractory material; or 1–25, preferably 2–7 mL/g of refractory material on a dry basis when the treatment is done in the gel stage. As the mixing continues, the volume of solids decreases and free liquid is released. The mixing can continue with the mixture getting less viscous because of the release of free liquid. Preferably, however, the thus-released liquid is evaporated to keep the consistency of the mixture the same. More preferably the released liquid is evaporated to cause the mass to become more viscous. Eventually the mass will become a solid to all outward appearances, although generally the mixing is stopped short of this point. The reason for this is that in accordance with the above-described procedure, voids are reduced and particles are thus agglomerated without significant damage to the pores of the refractory material. Carrying the mixing to the point where the material totally solidifies can result in damage to the pores, or in particles which are too strong for being fragmented during polymerization. Stated in terms of mixing time, generally 10 minutes to 15 hours, preferably 1 to 3 hours is used. The mixing time can vary, of course, depending on the intensity, with more intensive mixing requiring less time.

The terms mixing and working are used herein to describe the procedure employed on the refractory material. In the examples a planetary mixer was used. The procedure is most nearly analogous to kneading bread dough. Hence, machines such as pin granulaters, sigma mixers or banbury-type mixers designed to give intensive working can be utilized.

The refractory catalyst material employed in the practice of the present invention can be either new refractory material or the fines resulting from processing of a refractory material. Thus, the invention can be applied to a refractory material as produced, or a refractory material (with or without having been agglomerated in accordance with the invention) can have fines separated therefrom and the fines only subjected to treatment in accordance with this invention. These fines can be from raw refractory material as produced or can be from catalyst containing a catalytic agent such as chromium on a support such as silica. For instance, fines with a particle diameter of less than 50 microns are frequently produced in catalyst manufacture and are simply discarded. In accordance with this embodiment of this invention they can be used and are essentially comparable to the rest of the catalyst.

In a second embodiment of this invention a hydrogel or a gel wherein the water in the pores has been partially or essentially completely replaced with a water miscible volatile liquid organic compound such as an alcohol, preferably 1–6 carbon atom alcohols, is subjected to the same treatment described hereinabove with respect to the particulate solid material. The same scope of refractory materials, acids and polar organic liquids are applicable. As with the first embodiment, the preferred polar organic compound is methanol.

Although on initial working the gel will have a different consistency than the particulate refractory material, on milling or working of the gel it is reduced in volume due to evaporation of the polar liquid and approaches apparent dryness. Hence the same types of mixing equipment can be used as with the first embodiment. In this second embodiment the polar organic compound can simply be the material used for removing water from the hydrogel, these materials being water miscible, normally liquid volatile polar organic compounds such as alcohols. Methanol, as noted hereinabove is presently preferred. Initially the pores are filled with water, i.e., the material is a hydrogel. Milling or mixing can be initiated at this point or after some or essentially all of the water has been displaced with the polar organic compound. The acidic material can be combined with the polar organic compound in the same manner as in the first embodiment, preferably using an acidic chromium compound so as to impart chromium to the refractory material. After the treatment is complete the resulting milled or mixed material is dried of remaining liquid and calcined in the same manner as in the first embodiment.

There is one difference between the first and second embodiments in that, because the solids content of the gel in the second embodiment is relatively low, i.e., 10 to 25 percent generally, a greater amount of polar organic compound is used based on the weight of the refractory material on a dry basis. Generally 1 to 20, and preferably 2 to 7 milliliters of polar organic liquid per gram of refractory material is used, based on a solid basis, as noted above.

The invention is broadly applicable to any refractory material, such as magnesium oxide (magnesia), aluminum phosphate, silica, almunia, titania or combinations thereof, but is of particular applicability to aluminum phosphate or combinations thereof with other refractory materials, i.e. aluminum phosphate/alumina, aluminum phosphate/silica or aluminum phosphate/aluminum phosphate. In the latter instance a combination of aluminum phosphate having a P/Al ratio of from 0.1:1 to 0.4:1 and an aluminum phosphate having a P/Al ratio of from 0.5:1 to 1:1 gives a particularly desirable product. It is noted that aluminum phosphate with an aluminum to phosphorus ratio below 1 is not a mixture of true aluminum phosphate and alumina but rather is a unitary matrix structure.

The aluminum phosphate can be produced by combining an aluminum salt with a source of phosphate ions in any manner known in the art. Preferably, however, the aluminum phosphate is produced by combining the aluminum salt and a source of phosphate ions in a concentrated mass followed by neutralization to produce a gel as disclosed in McDaniel et al U.S. Pat. No. 4,364,855 (Dec. 21, 1982) the disclosure of which is hereby incorporated by reference and in McDaniel et al U.S. Pat. No. 4,364,854 (Dec. 21, 1982) the disclosure of the which is hereby incorporated by reference.

Briefly, this preferred process involves combining an aluminum salt and a source of orthophosphate ions, preferably in a concentrated mass. By concentrated mass is meant a system whereby an aluminum salt which melts is utilized in the molten state, or the ingredients are utilized as a syrup in water with preferably no more than 40 weight percent water based on the weight of aluminum salt being utilized. Even in the melt method it may be desirable to incorporate water. If water is employed, this is generally done in an amount of about 1 to 15 weight percent based on the weight of the aluminum salt, although up to 20 percent or even up to 40 percent can be utilized.

Generally, hydrated aluminum salts such as hydrated aluminum nitrate are most susceptible to being melted and thus are the preferred source of aluminum ions for the melt method. Aluminum bromide and hydrated aluminum bromate can also be used as can, broadly, any aluminum salt which will melt. Alternatively, an aluminum salt which will not necessarily melt but which will dissolve in water to form a syrup as described hereinabove can be utilized. Aluminum sulfate, for instance, is ideally suited for this embodiment of the invention.

The source of phosphate ions can be any source of phosphate ions and is generally orthophosphoric acid or an orthophosphate such as monobasic ammonium phosphate or dibasic ammonium phosphate or mixtures thereof.

The temperature, if a melt is used, can be any temperature at or above which the aluminum compound chosen will melt. The reaction can be carried out in any atmosphere including air or can be carried out under an inert atmosphere, if desired. Generally temperatures of 65° to 200°, preferably 65° to 100° C. are used.

Neutralization to produce a hydrogel can be carried out using any suitable neutralizing agent. Neutralization is generally carried out utilizing ammonia gas or ammonium hydroxide. The hydrogel is dried in a conventional manner to produce a xerogel.

If desired, further reduction in fines can be obtained by using a refractory material gelled in the presence of a water-soluble acrylamide polymer.

The acrylamide polymer can be incorporated, for instance, by means of an aqueous solution thereof which is simply mixed in any order with the aluminum salt and the source of phosphate ions. Alternatively the polymer in the form of a powder can simply be dissolved in the concentrated mass prior to gelling.

The acrylamide polymer is used in an amount calculated on a dry basis of about 1 to 20, preferably 2 to 15, more preferably about 10 weight percent based on the weight of the dry aluminum phosphate produced.

The acrylamide polymer employed can be a homopolymer or a copolymer having a sufficiently high molecular weight such that moderately viscous solutions result when the polymer is dissolved in water. This means solutions having a Brookfield LVF viscosity ranging from about 200 to about 5,000 centipoise at room temperature as 1 wt. % solutions in water (No. 3 spindle at 60 rpm and 23° C., ASTM D 1824).

The functionality of the polymer can be anionic, e.g. sodium acrylate copolymerized with acrylamide; nonionic, which is presently preferred; and cationic, e.g. beta-methacryloxyethyltrimethylammonium methyl sulfate copolymerized with acrylamide.

Generally, the anionic copolymers are least desired since the alkali metal cation present, if retained by the aluminum phosphate, can impair its subsequent catalytic activity.

Also, acrylamide copolymerized with unsaturated carboxylic acid comonomers such as acrylic acid are presently less desirable since it is known that polyvalent cations such as $Al^{+3}$ and $Cr^{+3}$ present in the solution to be gelled can gel a solution of the copolymer. Also N-vinyl-2-pyrrolidone/acrylamide copolymer can be used. The acrylamide will be the predominant monomer in the copolymer, when employed.

If the purpose is to produce a chromium catalyst support, the aluminum and phosphorus components are selected so as to give an atom ratio of phosphorus to aluminum within the range of about 0.1:1 up to 1:1, preferably about 0.2:1 up to 0.6:1. Broadly, however, any ratio, for instance from about 0.05:1 up to 2:1 can be used with orthophosphates and pyrophosphates and with polyphosphates the ratio can be from about 0.1:1 up to 5:1.

When the purpose is to produce a chromium olefin polymerization catalyst the chromium is preferably incorporated by simply utilizing a water soluble chromium compound which is coprecipitated with the refractory material. Broadly any chromium compound known in the art can be utilized. Suitable chromium compounds include chromium acetate, chromium nitrate and chromium oxide, for instance. Broadly any chromium compound known in the art can be utilized. It is also possible to incorporate the chromium compound as an aqueous solution to the hydrogel after formation thereof or as a hydrocarbon solution to the zerogel. The support of this invention can also be utilized as a base for zerovalent and divalent chromium compounds which, of course, are added after calcination. In any event the finished refractory material contains a catalytic amount of chromium.

Chromium is generally present in an amount within the range of about 0.001 up to 10, preferably 0.1 up to 5, more preferably about 1 weight percent based on the weight of the dried gel.

Figure 1:
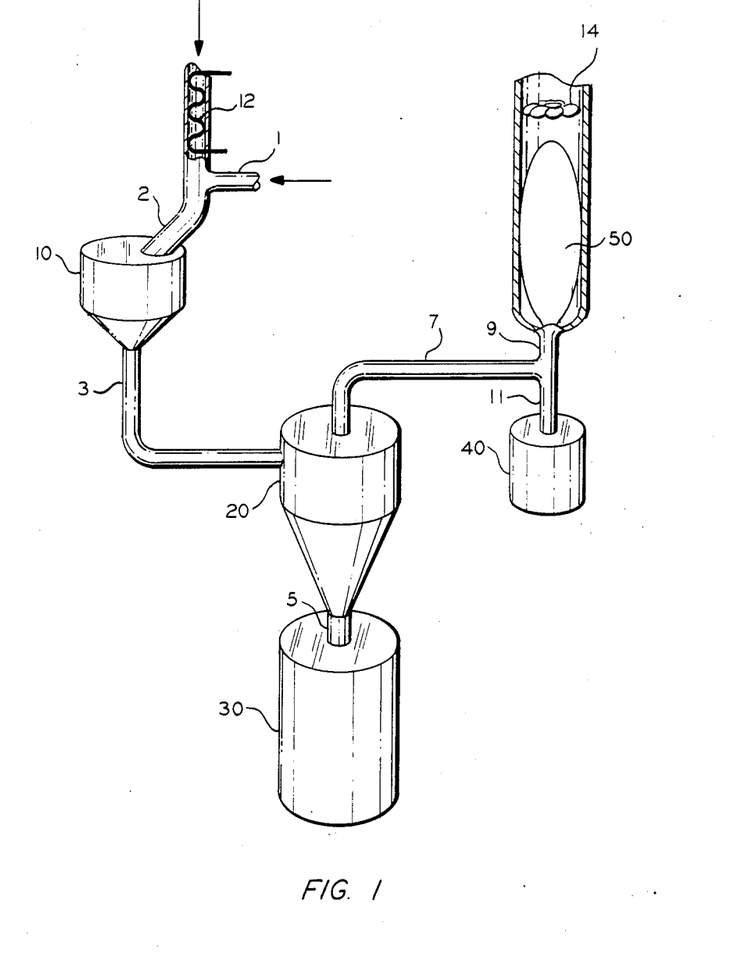
FIG. 1 is a schematic diagram of an equipment setup in which the invention particulation process can be carried out.

The invention particulation process will now be described in greater detail by reference to the figures. In accordance with the present invention, the agglomerated catalyst material is introduced into beater mill 10 via feed inlet 1. Particulated material is removed via outlet 3 and passed to cyclone 20 where finished particles settle out into receiving vessel 30, while fine materials are drawn through conduit 7 by fan 14. The very fine material is drawn up into bag filter 50, and is collected in receiving vessel 40.

Figure 2:
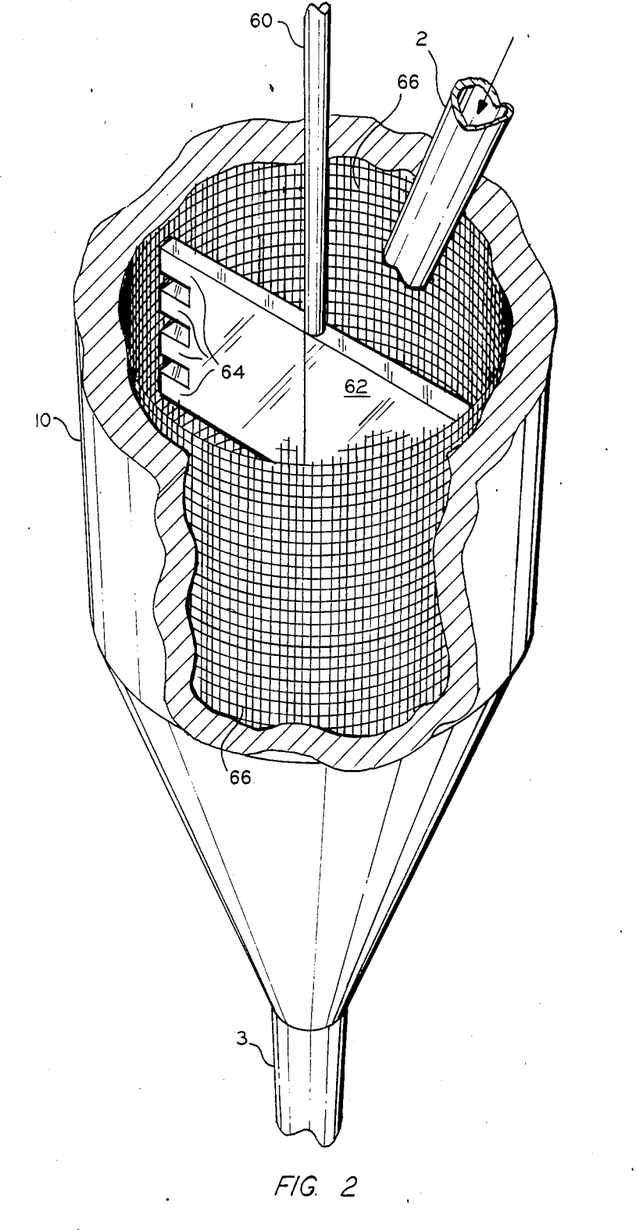
FIG. 2 is a partial cutaway view of a beater mill which can be employed in the practice of the present invention.

Referring now to FIG. 2, a beater mill suitable for use in the practice of the present invention is illustrated in partial cutaway view. The beater mill employed in the particulation process of the present invention comprises:

a cylindrical housing, a cylindrical screen having an inner and outer surface positioned within said housing concentric thereto, a shaft having an axis of rotation aligned colinearly with the axis of said cylindrical housing, and positioned in the center of said housing, at least one rotor having a plurality of blades thereon rotatably mounted on said shaft, wherein said blades extend outwardly in to close proximity with the inner surface of the cylindrical screen, inlet means for introducing air into said beater mill, and inlet means for introducing said agglomerated catalyst material into said beater mill.

In accordance with the present invention, the rotor of the beater mill is rotated at a speed sufficient to allow the blades thereon to cause the agglomerated catalyst material to break up. Generally, the speed of rotor rotation will vary depending on the dimensions of the beater mill, quantity of agglomerated catalyst material therein, etc. Speeds in the range of about 20 up to 1000 feet/second are suitable, with speeds in the range of 50 up to about 150 feet/second being preferred. The beater speed is also sufficient to cause the broken up agglomerated catalyst material to be thrown against the peripheral screen of the beater mill, and to pass therethrough.

The peripheral screen of the beater mill will be chosen so as to impart the desired particle size on those particles which pass through the screen. Typically, particle sizes in the range of about 10 up to 100 mesh are produced in accordance with the present invention, with particle sizes in the range of about 30 up to 60 mesh being preferred.

The quantity of air introduced via the air inlet means will be sufficient to cause at least a 10% reduction in the amount of volatile matter contained in the agglomerated catalyst material. Those of skill in the art recognize that the quantity and flow rate of air through the beater mill required to accomplish the desired degree of drying will vary depending on the nature of the refractory, the nature of the solvent to be removed, the temperature of the air, etc.

Particles which escape through the peripheral screen of the beater mill are carried by the air flow into a cyclone where they are collected for further use. As a result of the particulation process of the present invention, particles having a pore size greater than about $10^3$ Angstroms are preferentially destroyed relative to particles having a pore size less than about $10^3$ Angstroms. Thus, in a typical run (see Example 7 and Table 4 below), at least about 80% of those particles having a pore size greater than $10^3$ Angstroms are destroyed while less than about 40%, usually 25% or less, of the particles having a pore size of less than $10^3$ Angstroms are destroyed as a result of the invention particulation process.

After the acid treatment, working of the refractory material, etc., and finally particulation of catalyst in accordance with the present invention, the dried product is given a conventional finishing treatment. For instance, it can be activated in the same manner as in the prior art as disclosed in the above cited McDaniel et al patents. Generally where chromium is to be converted to the hexavalent state the chromium-containing xerogel is heated in an oxygen-containing ambient, generally air at a temperature within the range of 300° C. to 800° C., more preferably 300° C. to 600° C. for a time of 1 minute to 48 hours, preferably 0.5 to 10 hours.

The refractory materials produced by the novel method of this invention are particularly suitable as a support for a chromium catalyst for the production of polymers from at least one mono-1-olefin containing 2 to 8 carbon atoms per molecule. The catalysts are of particular applicability in producing ethylene homopolymers using a monomer feed which consists essentially of ethylene and copolymers of ethylene and one or more comonomers selected from mono-1-olefins containing 3 to 8 carbon atoms per molecule such as propylene, 1-butene, 1-pentene, 1-hexene and 1-octene. These polymers can be produced by solution polymerization, slurry polymerization, and gas phase polymerization using conventional equipment and contacting processes. Contacting of the monomer or monomers with the catalyst can be effected by any manner known in the art of solid catalysis. One convenient method is to suspend the catalyst in an organic medium and to agitate the mixture to maintain the catalyst in suspension throughout the polymerization process. Typically, predominantly ethylene copolymers are prepared using 0.5-20 weight percent comonomer as described above in the feed. Preferably sufficient comonomer is used to give 97 to 99.6 weight percent polymerized ethylene units in the resulting copolymer.

When the modified phosphate of this invention is used as a catalyst base for a chromium or vanadium olefin polymerization catalyst, the resulting catalyst can be used in conjunction with a cocatalyst if desired. Suitable cocatalysts include organic compounds of Groups IA, II and IIIA of the Periodic Table, primarily aluminum and boron alkyls. The most preferred boron compounds are trihydrocarbylboron compounds, particularly trialkylboron compounds, such as tri-n-butylborane, tripropylborane, and triethylborane (TEB). Suitable aluminum alkyls include $R_3Al$, $R_2AlX$, and $RAlX_2$ where R is a 1 to 12 carbon atom hydrocarbyl radical and X is a halogen preferably chlorine. Triethylaluminum and diethylaluminum chloride are particularly suitable.

The invention will now be described in greater detail with reference to the following nonlimiting examples.

EXAMPLE 1

Description of Mechanical Device

A Stokes-Penwalt Toronado Mill Model 44-0 was modified to have an explosion proof motor and switching, an air tight collection drum, a fan to pull air through (optionally, heated air), and a cyclone. The general parameters employed were:

1. Air flow = 1000 CFM (cubic feet per minute).
2. Screen circumference = 34″, Width = 6″.
3. Motor RPM = 3480.
4. Beater RPM varies from 50% to 200% of motor RPM depending on choice of pulleys.

5. Beater angle=45 degrees.

EXAMPLE 2A

This example demonstrates the preparation of the catalyst to be used as a feedstock for this invention.

An aluminophosphate catalyst was made according to U.S. Pat. No. 4,444,964 in which the phosphorus to aluminum ratio was 0.5. Aluminum nitrate nonahydrate and ammonium phosphate monobasic were melted together and gelled by the addition of concentrated ammonium hydroxide. The gel was washed several times in water to remove nitrate, then three times in n-propanol which displaces water from the pores of the gel. Final composition of the gel was about 20% solids, the liquid component being 6% water and 94% n-propanol. This gel was dried under 25″ Hg of vacuum at 110 C. for 72 hours giving a white, highly porous, fluffy powder. It was then calcined at 400 C. for 4 hours. Screen analysis of this dusty powder yielded the particle size distribution shown in Table 1 under "Feedstock". It had a bulk density of 0.33 g/cc. Because the material was so fine, it transferred very poorly. In fact it tended to pack down in the bottle, and when turned on its side would bridge, holding almost a 90 degree angle of repose.

TABLE 1

(Example 2)
Particle Distribution Before and After
Particulation Through a 50 Mesh Screen

| Particle Size | Feedstock (Before) | Finished Catalyst (After) |
|---|---|---|
| >35 mesh | 0% | 0% |
| >60 mesh | 0% | 2.8% |
| >100 mesh | 5.1% | 44.7% |
| >200 mesh | 16.3% | 43.0% |
| >325 mesh | 35.2% | 6.7% |
| ≦325 mesh | 43.4% | 2.8% |
| Bulk Density | .33 g/cc | .52 g/cc |
| Angle of Repose | ~90 degrees | 35 degrees |

EXAMPLE 2B (Invention)

This example describes the preparation of the dough and its processing through a 50 mesh screen.

Exactly 10.0 Kg of the catalyst base from Example 2A was used as a starting material for this particulation experiment. Methanol (1.4 liters per Kg or 14 liters) was used as a solvent to dissolve 770 g of chromium nitrate nonahydrate, i.e., enough Cr to equal 1% by weight of the catalyst base. The base easily absorbed the Cr/methanol solution and remained dry in appearance. The powdery material was then worked and stirred in a 10 gallon planetary mixer. After about one half hour it turned into a paste or dough consistency due to the compression of large pores. After another one and one half hours of mixing with occasional addition of more methanol, the dough was then ready for particulation. At this stage it contained 77.5% volatiles.

The dough was then processed through the Toronado mill described in Example 1. The mill was equipped with a 50 mesh screen, and the beating speed was set at one half that of the motor. Maximum fan speed was used. It took 45 minutes to particulate the whole 10.0 Kg batch. After particulation the catalyst contained 57.6% volatiles. It was dried in a vacuum oven at 25 mm Hg overnight at 100° C. The bulk density of the material after calcining at 400° C. for 4 hours was greatly improved, 0.52 g/cm³, and the final particle size distribution is shown in Table 1 under "Finished Catalyst". It transferred smoothly, having an angle of repose of 35 degrees.

EXAMPLE 3

(Invention)

This example demonstrates the use of different screen sizes to control the product particle size.

The procedure of Example 2B was repeated with a similar feedstock having a phosphorus to aluminum ratio of 0.6:1. This time, however, the Toronado Mill was equipped first with a 20 mesh screen, then with a 30 mesh screen. Notice in Table 2 that the resulting particle size is much coarser then in Example 2B, where a 50 mesh screen was used, but that the distribution is still very narrow—a characteristic of the invention process. The finished product also had a high bulk density and transfer occurred easily.

TABLE 2

(Example 3)
Particle Size Distribution Before and After
Particulation through a 20 and 30 Mesh Screen

| Particle Size | Before | After (20 Mesh) | After (30 Mesh) |
|---|---|---|---|
| >35 mesh | 0% | 30.0% | 1% |
| >60 mesh | 0% | 33.7% | 25% |
| >100 mesh | 0% | 12.6% | 39% |
| >200 mesh | 28.3% | 15.4% | 23% |
| >325 mesh | 33.5% | 5.1% | 9% |
| ≦325 mesh | 38.2% | 3.1% | 3% |
| Bulk Densiy | .33 g/cc | .52 g/cc | .42 g/cc |
| Angle of Repose | ~90 deg | 45 deg | 40 deg |

EXAMPLE 4

(Control-Dry Milling)

This example demonstrates the importance of using a wet soft dough or gel and not a hard brittle dry feedstock.

In this example the feedstock of Example 3 was again used. It was again impregnated with Cr/methanol solution and worked into a dough as in examples 2B and 3. However, this time the dough was not milled, but instead dried in the vacuum oven overnight at 110° C. and 25 mm Hg vacuum, then calcined at 400° C. for 4 hours. The result was one hard lump or brick having the same shape as the pan in which it had been cast and dried. The brick was so hard that it could not be broken between the fingers or even between the hands. Grinding was difficult even in a mortar and pestle. This brick was then dropped into the modified Tornado Mill described in Example 1. No particulation resulted, only a cloud of dust. The particle size distribution is shown in Table 3.

TABLE 3

(Example 4)
Particle Size Distribution Obtained by Dry Milling

| Particle Size | Amount |
|---|---|
| >35 mesh | 1% |
| >60 mesh | 5% |
| >100 mesh | 9% |
| >200 mesh | 23% |
| >325 mesh | 29% |
| ≦325 mesh | 32% |

EXAMPLE 5

(Control-Too Wet)

This example demonstrates what happens when the feedstock is too wet.

In this example the procedure of Example 2B was repeated using a similar feedstock having a phosphorus to aluminum ratio of 0.6:1. But about 50% more methanol was added to the solution than was used in Example 2B (i.e., about 2.1 liters per Kg of methanol employed). Instead of a dough, this made a thin slurry. When poured into the Tornado mill at the same rate as above in Example 1, no particulation occurred. Instead a foam formed outside the screen, and tended to block it. When the feeding rate was cut back to allow additional time for methanol evaporation, little particulation occurred. What little particulation did occur produced a fine powder, mostly finer then 200 mesh. This shows that the ideal feed material is a dough.

EXAMPLE 6

(Control—No Air Flow)

This example demonstrates the importance of evaporation during the particulation.

In this example the procedure of Example 2B was repeated, but the fan which pulls air through the Toronado mill was turned off. When the dough was dropped into the mill in the absence of air flow therethrough, no particulation occurred. It simply gummed over the screen and blocked it.

This shows that to be effective, the particulation must be accompanied by sufficient air flow to cause enough evaporation to partially dry the exterior of each particle and allow it to fall freely into the collector without sticking to the screen or to other particles. Even with a good air flow, gumming of the screen can still occur if the dough is fed too rapidly. Again the feed rate must be balanced with the evaporation rate so that the particles emerge superficially dry. Of course, the feed rate can be increased if a more volatile organic is used, or if the air flow is heated.

EXAMPLE 7

(Porosity Change)

This example illustrates the beneficial change in porosity which accompanies the invention method of particulation.

The pore size distribution of a number of catalysts was obtained by mercury porosimetry before and after particulation. The particulation was accomplished according to the procedure of Example 2B. Results are shown in Table 4. While the particulation process causes a decrease in the overall pore volume, closer inspection reveals that the largest pores are removed (probably by the beating action); however, pores smaller than 1000 Angstroms diameter, or especially smaller than 300 Angstroms, are not greatly affected. Since most of the surface area comes from the small pores, i.e., those <100 Angstoms, the process does minimal harm to surface area and therefore to the catalyst activity. But the compaction process does improve particle bulk density, fluidity and particle hardness.

TABLE 4

(Example 7)
Change in Porosity Caused by Particulation Process

| | | Pore Diameter Angstroms | | | | | | Surf. Area, $m^2/g$ |
|---|---|---|---|---|---|---|---|---|
| | | 30–100 | 100–300 | 300–$10^3$ | $10^3$–$10^4$ | $10^4$–$10^5$ | Total | |
| P/Al = .2 | Before | .78 | 1.02 | | .99 | .51 | 3.30 | 360 |
| | After | .79 | 0.41 | | .09 | .18 | 1.37 | 351 |
| P/Al = .4 | Before | .77 | .64 | .85 | .65 | .70 | 3.61 | 548 |
| | After | .84 | .54 | .33 | .07 | .19 | 1.97 | 492 |
| P/Al = .6 | Before | .73 | .42 | .28 | .38 | .27 | 2.08 | 242 |
| | After | .80 | .38 | .15 | .09 | .04 | 1.46 | 293 |

EXAMPLE 8

(Polymerization)

This example demonstrates utility of the catalysts made by the process of this invention.

About ten grams of the finished catalyst from Example 2B was place in a 2" diameter quartz tube where it rested on a sintered glass frit. Dry air was then introduced from the bottom of the tube at the rate of about 0.15 ft/sec. Because the particles were hard, dense, smooth, and of uniform size, the catalyst bed began to fluidize nicely, whereas the feedstock catalyst would not. Heat was then introduced by means of an electrical furnace, and the temperature of the bed increased over 1.5 hour to 600° C., where it was held for 3 hours while continuing to fludize nicely. During this time no catalyst blew over, indicating no attrition (due to the hardness of the particle) and few fines (due to the narrowness of the particle size distribution). The bed was then cooled down to 25° C. (by removing the furnace) and stored under dry nitrogen.

Exactly 0.0467 g of the above catalyst was then charged under dry $N_2$ to a 2 liter stirred autoclave. Then 600 g of isobutane liquid was added and 1 mL of a 0.5% solution of triethylborane in heptane. The temperature was increased to 95° C. and the ethylene was added on demand at 550 psi. Polymerization started immediately and continued vigorously for 0.5 hour while the temperature was maintained at 95° C. by means of the reactor jacket, which contained boiling alcohol. After 30 minutes the ethylene and isobutane were flashed off, leaving 195 g of white polyethylene granules. This amounts to an activity of 8350 grams of polymer per gram of catalyst per hour (g/g-h). The polymer had a high load melt index of 18.3 g/10 min. Because the polymer particle tends to replicate the catalyst particle, dense particulate polymer granules were also obtained. Again, this is highly valued in the handling of the polymer, and can even eliminate the need for pelletization.

EXAMPLE 9

(Hydrogel)

This example demonstrates the use of the raw hydrogel instead of a dough made by wetting the dry catalyst powder.

Aluminum nitrate nonahydrate and ammonium phosphate monobasic was melted together as described in Example 2 to make a thick syrup having P/Al=0.6. This time chromium nitrate nonahydrate was also added to the melt so that the final catalyst contained 1 wt% Cr after coprecipitation. Then concentrated ammonium hydroxide was added until a hard gel formed. The gel was washed twice with water to remove nitrate ions, and then once with ispropyl alcohol to displace water from the pores. This gel was then packed down on a vacuum filter giving a cake that contained 83% volatiles but still had the consistency of soft dough. It was then fed into the modified Toronado mill as described in Example 2B but at only about half the feed rate. The mill was equipped with a 30 mesh screen. Again nicely formed particles, which contained 61% volatiles were collected from the cyclone at the end of the run. These were vacuum dried overnight at 110° C. The resulting particles had high bulk density of about 0.46 g/cc, and the particle size distribution as shown in Table 5.

TABLE 5

(Example 9)
Particle Size Distribution Obtained by Milling the Raw Gel

| Particle Size | Amount |
| --- | --- |
| >60 mesh | 42% |
| >100 mesh | 23% |
| >200 mesh | 17% |
| >325 mesh | 12% |
| ≦325 mesh | 6% |

EXAMPLE 10

(Hydrogel)

This example demonstrates again the particulation of hydrogel and shows how the particle size can be controlled through the proper choice of screens in the beater mill.

Another hydrogel similar to that formed in Example 9 but with a P/Al=0.4 was washed with n-propanol (instead of i-propanol) and packed down on a drum filter to yield a cake containing 79% volatiles. The cake was Toronado milled first through a 30 mesh screen, and then a second run was made with a 60 mesh screen. The particles collected contained 50% volatiles. The particle size distribution obtained after drying and calcining is shown in Table 6. Again the particle size can be adjusted, but both runs demonstrate that a very narrow distribution and few fines are produced in accordance with the present invention.

TABLE 6

(Example 10)
Particle Size Controlled by Choice of Screen in Milling of the Raw Gel

| Particle Size | Processed thru 30 mesh | Procssed thru 60 mesh |
| --- | --- | --- |
| >60 mesh | 49% | 1% |
| >100 mesh | 24% | 47% |
| >200 mesh | 17% | 31% |
| >325 mesh | 8% | 14% |
| ≦325 mesh | 2% | 7% |

EXAMPLE 11

(Co-agglomeration)

This example demonstrates the co-milling of two entirely different catalysts to make an intimate blend in which each particle contains elements of both ingredients. Exactly 1.00 Kg of Davison 952 silica (PV=1.6 cc/g, SA=300 m²/g) added to a planetary mixer along with 4.8 Kg of P/Al=0.4 aluminophosphate hydrogel containing 21% solids (that is, a 50/50 mixture of the two solid components). The hydrogel had been previously washed with n-propanol. Another 2 liters of methanol was then added and the mixture stirred for 30 minutes to a doughy consistency. Then 231 g of chromium nitrate nonahydrate (enough to equal 1.5% Cr by weight on the finished catalyst) was added and the mixture stirred another 1.5 hours until it assumed a clay-like consistency. It was then Toronado milled through a 50 mesh screen and dried under vacuum overnight. After calcining the particle size distribution was obtained and is shown in Table 7.

TABLE 7

(Example 11)
Coagglomeration of Silica and Aluminophosphate

| Particle Size | Amount |
| --- | --- |
| >60 mesh | 13.7% |
| >100 mesh | 55.3% |
| >200 mesh | 27.4% |
| >325 mesh | 2.9% |
| ≦325 mesh | 0.6% |

This distribution is not at all like that of the two ingredients. The absence of fines is especially significant because both of the compounds were very fine, i.e., for the silica, ~20% passed through 325 mesh; while for the aluminophosphate, ~40% passed through 325 mesh. This proves that the catalyst is not just a blend of the two components, but that each particle formed by the process contains an intimate mixture of both ingredients. Thus physical segregation of the two components is not possible during handling. This is highly useful because the polymers obtained from these coagglomerated catalysts also contain an intimate mixture of two types of polymers which cannot be segregated.

The examples have been provided merely to illustrate practice of our invention and should not be read so as to limit the scope of our invention or the appended claims in any way. Reasonable variations and modifications, not departing from the essence and spirit of our invention, are contemplated to be within the scope of patent protection desired and sought.

That which is claimed is:

1. A method for producing particles having a controlled particle size, from agglomerated catalyst material which comprises:
    (a) introducing said agglomerated catalyst material into a beater mill comprising:
    a cylindrical housing,
    a cylindrical screen having an inner and outer surface positioned within said housing concentric thereto,
    a shaft having an axis of rotation aligned colinearly with the axis of said cylindrical housing, and positioned in the center of said housing,
    at least one rotor having a plurality of blades thereon rotatably mounted on said shaft, wherein said blades extend outwardly into close proximity with the inner surface of the cylindrical screen,
    inlet means for introducing air into said beater mill, and
    inlet means for introducing said agglomerated catalyst material into said beater mill;
    (b) breaking said agglomerated catalyst material into smaller size particles by rotating said shaft and said plurality of blades; while (c) concurrently passing a sufficient volume of air through said beater mill to remove sufficient volatile material from said agglomerated catalyst material to render said agglomerated catalyst material non-sticky as said agglomerated catalyst material passes through said cylindrical screen; and thereafter (d) recovering said particles having a controlled particle size distribution.

2. A method in accordance with claim 1 wherein said particle size is in the range of 50 up to 500 microns.

3. A method in accordance with claim 1 wherein said particles having a controlled particle size are further characterized by having a pore volume of at least 0.5 cm$^3$/g, a bulk density of at least 0.3 g/cm$^3$, and a narrow particle size distribution.

4. A method in accordance with claim 1 wherein said agglomerated catalyst material is prepared by:
   (a) combining an acidic composition in a polar organic compound with a refractory material to provide a workable mixture, and
   (b) working said mixture until a decrease in volume occurs.

5. A method according to claim 4 wherein said refractory material is silica or silica-titania.

6. A method according to claim 4 wherein said refractory material is alumina.

7. A method according to claim 4 wherein said refractory material is aluminum phosphate having a phosphorus:aluminum ratio within the range of 0.2:1 to 0.6:1.

8. A method according to claim 4 wherein said acidic composition is one of nitric acid, hydrochloric acid, acetic acid and chromium nitrate.

9. A method according to claim 4 wherein said acidic composition is a fluoride.

10. A method according to claim 4 wherein said refractory material is magnesia.

11. A method according to claim 4 wherein said liquid polar organic compound is an alcohol, containing up to 10 wt. % water.

12. A method according to claim 4 wherein said alcohol is methanol.

13. A method according to claim 4 wherein said refractory material is a solid particulate material, wherein said liquid polar organic compound is used in an amount within the range of about 0.1 to 2 times the total volume of voids and pores in said refractory material.

14. A method according to claim 4 wherein said refractory material is a combination of refractory materials.

15. A method according to claim 14 wherein said combination comprises aluminum phosphate and alumina.

16. A method according to claim 14 wherein said combination comprises aluminum phosphate and silica.

17. A method according to claim 14 wherein said refractory material is a combination of two aluminum phosphates.

18. A method according to claim 4 wherein said refractory material is fines resulting from catalyst production.

19. A method according to claim 4 wherein said refractory material is aluminum orthophsophate, said liquor polar organic compound is methanol, said methanol is combined in an amount sufficient to impart initial incipient wetness to said aluminum orthophosphate and wherein said acidic composition is selected from nitric acid, hydrochloric acid, acetic acid and chromium nitrate.

20. A method in accordance with claim 1 wherein the flow rate of air passed through said beater mill is sufficient to reduce the amount of volatile material by at least 15% relative to the initial content of volatiles in said agglomerated catalyst material.

21. A method in accordance with claim 20 wherein said air passed through said beater mill is heated to a temperature in the range of about 20° up to 80° C.

22. A method in accordance with claim 1 wherein at least 80% of said particles having a pore size greater than about 10$^3$ Angstroms are destroyed, while no greater than about 40% of said particles having a pore size less than about 10$^3$ Angstroms are destroyed.

23. A method in accordance with claim 1 wherein said controlled particle size distribution comprises less than 10 wt % of said particles as fine material having a particle size less than 50 microns.

* * * * *